(12) United States Patent
Yi et al.

(10) Patent No.: US 9,014,010 B2
(45) Date of Patent: Apr. 21, 2015

(54) METHOD AND APPARATUS FOR REPORTING PDCP STATUS

(71) Applicant: LG Electronics Inc., Seoul (KR)

(72) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/235,761

(22) PCT Filed: Sep. 18, 2012

(86) PCT No.: PCT/KR2012/007463
§ 371 (c)(1),
(2) Date: Jan. 28, 2014

(87) PCT Pub. No.: WO2013/048049
PCT Pub. Date: Apr. 4, 2013

(65) Prior Publication Data
US 2014/0254393 A1  Sep. 11, 2014

Related U.S. Application Data

(60) Provisional application No. 61/539,955, filed on Sep. 27, 2011, provisional application No. 61/541,099, filed on Sep. 30, 2011.

(51) Int. Cl.
*H04L 12/26* (2006.01)
*H04W 64/00* (2009.01)
*H04W 24/10* (2009.01)
*H04W 72/04* (2009.01)

(52) U.S. Cl.
CPC .............. *H04W 64/00* (2013.01); *H04W 24/10* (2013.01); *H04W 72/0413* (2013.01)

(58) Field of Classification Search
CPC ......... H04L 12/28; H04L 12/26; H04L 29/00; H04L 9/00; H04L 12/56; H04W 80/00; H04W 36/00; H04W 36/02; H04W 4/00; H04W 40/00; H04W 8/00; H04W 12/04; H04W 72/04; G06F 11/30; H04Q 7/00
USPC ......... 370/242, 394, 331, 252, 241, 477, 328, 370/335, 329, 315; 455/422.1, 410; 380/270

See application file for complete search history.

(56) References Cited

U.S. PATENT DOCUMENTS

2008/0175249 A1* 7/2008 Yi et al. ........................ 370/394
2009/0103445 A1* 4/2009 Sammour et al. ............. 370/252

(Continued)

FOREIGN PATENT DOCUMENTS

EP       1689130       8/2006
EP       1915017       4/2008
WO   WO 2011057559 A1 *  5/2011

*Primary Examiner* — Bob Phunkulh
*Assistant Examiner* — Wali Butt
(74) *Attorney, Agent, or Firm* — Lee, Hong, Degerman, Kang & Waimey

(57) ABSTRACT

A method and apparatus for method for reporting a Packet Data Convergence Protocol (PDCP) status are provided. A wireless device sets up a radio bearer that does not perform retransmission at a Radio Link Control (RLC) layer and transmit a PDCP status report for the radio bearer to a base station, the PDCP status report indicating which at least one PDCP Service Data Unit (SDU) is missing.

16 Claims, 5 Drawing Sheets

(56) References Cited

U.S. PATENT DOCUMENTS

2009/0104890 A1* 4/2009 Wang et al. .................. 455/410
2009/0238142 A1* 9/2009 Chun et al. .................. 370/331
2009/0316664 A1* 12/2009 Wu ............................... 370/336
2012/0040621 A1* 2/2012 Jung et al. .................. 455/67.11

* cited by examiner

METHOD AND APPARATUS FOR REPORTING PDCP STATUS

CROSS-REFERENCE TO RELATED APPLICATIONS

This application is the National Stage filing under 35 U.S.C. 371 of International Application No. PCT/KR2012/007463, filed on Sep. 18, 2012, which claims the benefit of U.S. Provisional Application Ser. Nos. 61/539,955, filed on Sep. 27, 2011, and 61/541,099, filed on Sep. 30, 2011, the contents of which are all hereby incorporated by reference herein in their entirety.

BACKGROUND OF THE INVENTION

1. Field of the Invention

The present invention relates to wireless communications, and more particularly, to a method and apparatus for reporting Packet Data Convergence Protocol (PDCP) status in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by operators for coverage optimization by using a user equipment (UE) instead of using an automobile. A coverage varies depending on a location of a base station, deployment of buildings nearby, a user's usage environment, etc. Therefore, it is required for the operators to periodically perform the driving test, and a lot of costs and resources are consumed. The MDT is used when the operator measures the coverage by using the UE.

One of the objectives of the MDT is Quality of Service (QoS) verification. Usage of UE specific QoS measurements is to verify performance relevant to end user perception. This also allows detecting critical conditions and determining the need to change the network configuration, parameter settings or capacity extension. Operators may use this information to assess the actual QoS experienced by the end user, check whether the actual QoS meets the planning target, and find critical factors determining actual QoS. Operators may also use this information together with the location information to draw a QoS map of the cell.

For QoS verification, there is a need to measure actual user throughput. Logging of data volume for a given Data Radio Bearer can be used to derive the user throughput. The data volume can be defined in terms of number of bytes of Packet Data Convergence Protocol (PDCP) Service Data Unit (SDU) in the logging period.

To log the data volume transmitted and received by the UE, the UE has to calculate the amount of data each time it transmits or receives, and also keeps the result of calculation until it reports the result to a base station. It may increase UE complexities, and waste UE memory and battery.

SUMMARY OF THE INVENTION

The present invention provides a method and apparatus for reporting Packet Data Convergence Protocol (PDCP) status in a wireless communication system.

In an aspect, a method for reporting a Packet Data Convergence Protocol (PDCP) status in a wireless communication system is provided. The method includes setting up a radio bearer that does not perform retransmission at a Radio Link Control (RLC) layer, and transmitting a PDCP status report for the radio bearer to a base station, the PDCP status report indicating which at least one PDCP Service Data Unit (SDU) is missing.

The radio bearer may be mapped on RLC Unacknowledged Mode (UM).

In another aspect, a wireless device configured for reporting a Packet Data Convergence Protocol (PDCP) status in a wireless communication system is provided. The wireless device includes a radio frequency unit configured to receive and transmit a radio signal, and a processor, operably coupled with the radio frequency unit, configured to set up a radio bearer that does not perform retransmission at a Radio Link Control (RLC) layer and transmit a PDCP status report for the radio bearer to a base station, the PDCP status report indicating which at least one PDCP Service Data Unit (SDU) is missing.

In still another aspect, a method for reporting a Packet Data Convergence Protocol (PDCP) status in a wireless communication system is provided. The method includes setting up a radio bearer that is mapped on RLC Unacknowledged Mode (UM) or RLC Acknowledged Mode (AM), receiving a request for a PDCP status from a base station, and transmitting a PDCP status report for the radio bearer to a base station as a response of the request.

To avoid wireless device's calculating data volume and storing the calculation result, it is proposed that the wireless device provides QoS related information to a base station.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station may be generally a fixed station that communicates with the wireless device and may be referred to as another terminology, such as an evolved node-B (eNB), a base transceiver system (BTS), an access point, etc.

Hereinafter, it is assumed that a wireless communication system is based on 3rd Generation Partnership Project (3GPP) Long Term Evolution (LTE) or 3GPP LTE-Advanced (LTE-A). However, the wireless communication system to which the present invention is applied is not limited to the 3GPP LTE/LTE-A system. Thus, the present invention may be applicable to various wireless communication systems.

Figure 1:
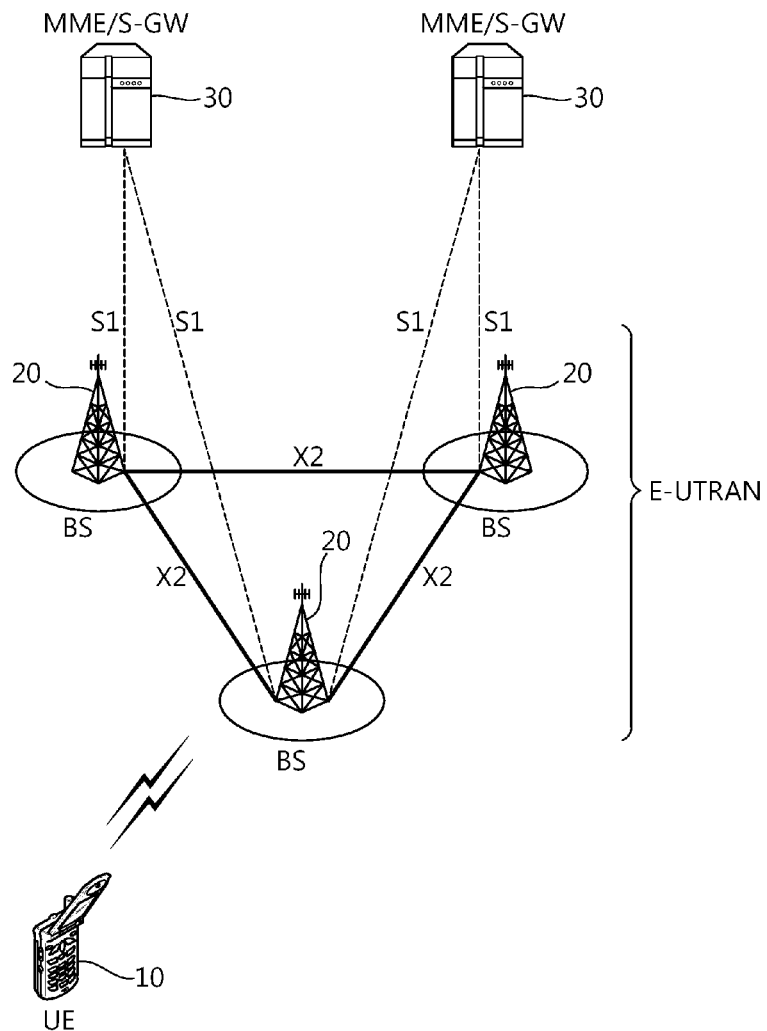
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a LTE/LTE-A system.

The E-UTRAN includes at least one base station (BS) 20 which provides a control plane and a user plane to a user equipment (UE) 10. The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
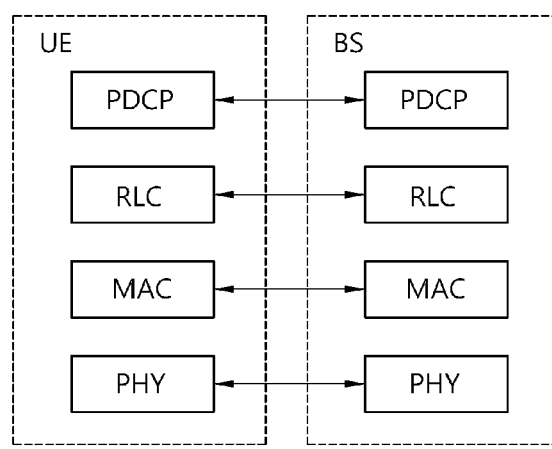
FIG. 2 is a diagram showing a radio protocol architecture for a user plane.
Figure 3:
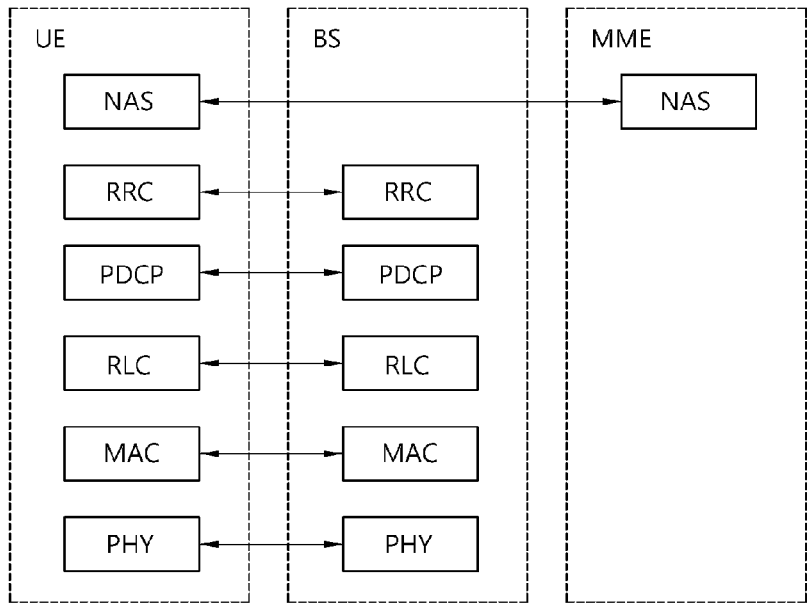
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The UM RLC receives SDUs from the higher layers and segments the SDUs into appropriate RLC PDUs without adding any overhead. The AM RLC provides retransmission by using an automatic repeat request (ARQ). The UM RLC does not provide retransmission.

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 4:
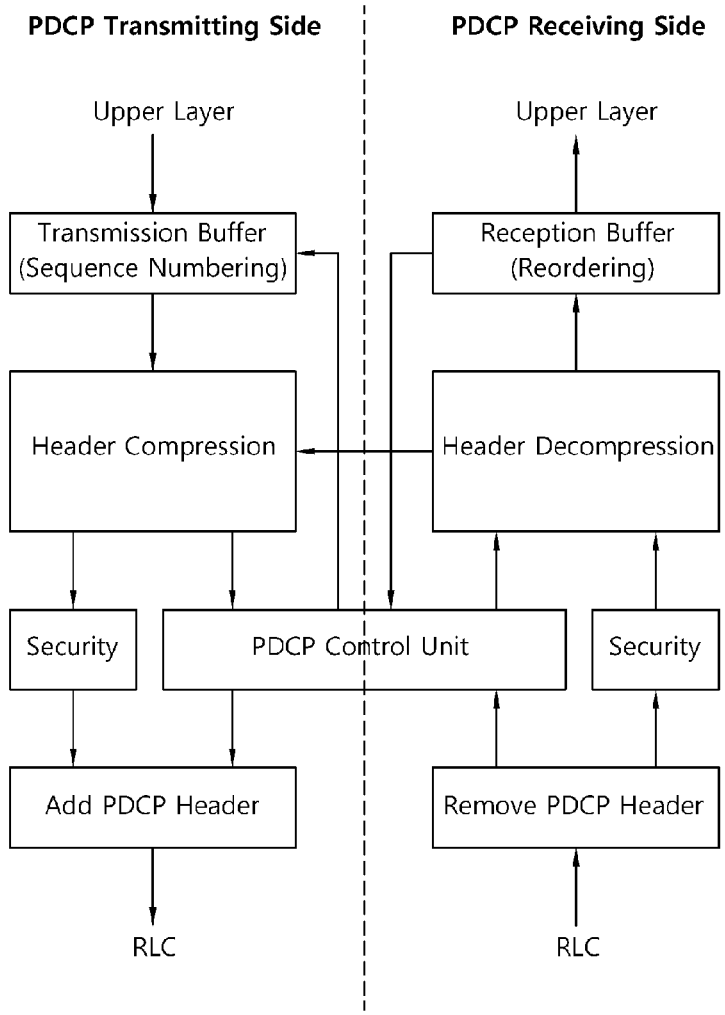
FIG. 4 shows an exemplary structure of PDCP layer.

FIG. 4 shows an exemplary structure of PDCP layer.

A PDCP layer is connected with an upper layer, i.e. a RRC layer or user application, and is also connected with a lower layer, i.e. RLC layer.

One PDCP layer may include a PDCP transmitting side and a PDCH receiving side. The PDCP transmitting side may construct a PDCP PDU by using SDUs received from the upper layer and/or control information generated by the PDCP layer itself The PDCP PDU is sent to the PDCH receiving side which extracts the SDUs and/or the control information.

There are two types of PDCP PDU: PDCP Data PDU and PDCP Control PDU. The PDCP Data PDU may be a data block constructed by the PDCP layer from the SDU(s) received from the upper layer. The PDCP Data PDU may be generated at SRB and/or DRB. The function of Header Compression is provided to DRB and the function of Integrity Protection is provided to SRB. The Cyphering which keeps data security is provided to both SRB and DRB.

The PDCP Control PDU may be a data block carrying the control information and may be generated at DRB. The PDCP Control PDU includes a PDCP Status PDU and header compression control information.

Figure 5:
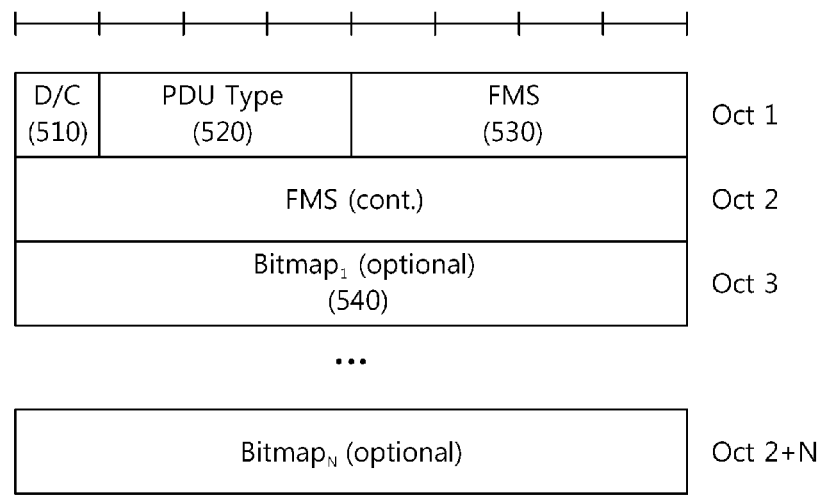
FIG. 5 shows an exemplary structure of PDCP Status PDU.

FIG. 5 shows an exemplary structure of PDCP Status PDU.

A PDCP Status PDU is used to convey a PDCP status report indicating which PDCP SDUs are missing.

A D(Data)/C(Control) field 510 indicates that a corresponding PDU is a Control PDU or a Data PDU.

A PDU type field 520 indicates a type of PDCP Control PDU. For example, if the PDU type field 520 is set to '000', the PDCP Control PDU carries the PDCP status report. If the PDU type field 520 is set to '001', the PDCP Control PDU carries header compression control information.

A First Missing Sequence number (FMS) field 530 indicated a Sequence Number (SN) of a first missing PDCP SDU.

A Bitmap field 540 has a variable length. The Most Significant Bit (MSB) of the first octet of the Bitmap field 540 indicates whether or not the PDCP SDU with the SN (FMS+1) modulo 4096 has been received and, optionally decompressed correctly. The Least Significant Bit (LSB) of the first octet of the Bitmap field 540 indicates whether or not the PDCP SDU with the SN (FMS+8) modulo 4096 has been received and, optionally decompressed correctly. If a bit of the Bitmap field 540 is set to '0', a corresponding SDU is missing. If a bit of the Bitmap field 540 is set to '1', a corresponding SDU is received and it does not need retransmission.

There is a demand from operators to assess actual Quality of Service (QoS) experienced by the end user. QoS verification is a technique to check whether the actual QoS to the end user meets the planning target.

One of parameters for QoS verification is a data volume. The data volume can be defined in terms of number of bytes of PDCP SDU in a logging period. The periodic logging of data volume for a given Data Radio Bearer can be used to derive the user throughput. A UE reports the data volume. A BS calculates the UE's throughput based on the data volume. An operators performs cell capacity optimization based in the the UE's throughput.

The data volume may be calculated based on PDCP SDU(s) that may be related to actual user throughput most closely. For downlink QoS verification, a UE may calculate an amount of PDCP SDU which is successfully received from a BS. For uplink QoS verification, a UE may calculate an amount of PDCP SDU which is successfully transmitted to a BS.

The amount of PDCP SDU which is successfully received can easily be calculated by calculating PDCP SUD(s) that is transferred from a PDCP layer to an upper layer. In contrast, to calculate the amount of PDCP SDU which is successfully transmitted, the UE needs to know how many PDCP SDUs are successfully received by a BS.

For a RB which is mapped on RLC AM, the UE can calculates the amount of downlink/uplink PDCP SDUs that are successfully received/transmitted based on the RLC status PDU and HARQ feedback. For a RB which is mapped on RLC UM, the UE can calculates the amount of downlink/uplink PDCP SDUs that are successfully received/transmitted based on HARQ feedback since RLC UM does not provide any retransmission.

There are many problems to be solved in order for a UE to report data volume for each RB. First, complexity to calculate the data volume may increase. Second, battery consumption may increase due to the calculation of the data volume. Third, more memory capacity to store the data volume is required. Forth, additional signaling to send the data volume is required.

It is proposed that a network can acquire the data volume for each RB and the UE does not need to calculate the data volume by itself To avoid UE's calculating the data volume and storing the calculation result, it is proposed that the UE provides QoS related information to the BS, and the BS calculates the QoS of the RB. The UE's provided information may be different between downlink RB and uplink RB.

Figure 6:
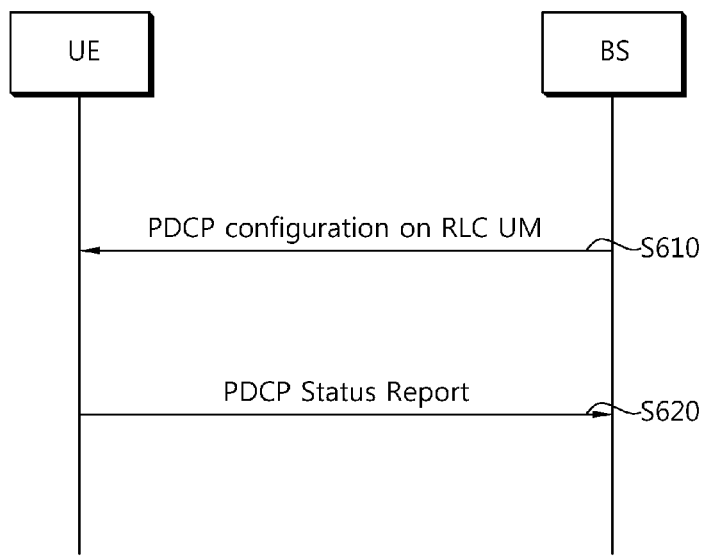
FIG. 6 is a flowchart showing a method for reporting PDCP status according to an embodiment of the present invention.

FIG. 6 is a flowchart showing a method for reporting PDCP status according to an embodiment of the present invention.

In step S610, a UE sets up a RB mapped on RLC UM and receives a PDCP configuration on the RLC UM. The PDCP configuration enables the UE to report a PDCP status.

In step S620, a UE transmits a PDCP status report for the RB to a BS according to the PDCP configuration. The network can calculates the missing PDCP SDU(s) and the successful PDCP SDU(s) based on the PDCP status report and then can calculate the throughput and an error rate. The throughput may be calculated as a sum of bytes of all successful PDCP SDU(s) over a reporting duration. The error rate may be calculated as a sum of bytes of all missing PDCP SDU(s) over a reporting duration.

For the DL transmission, the UE sends PDCP status report to the BS. The PDCP status report may describe the latest PDCP reception buffer status, i.e. which PDCP SDU is correctly received and which is not. When the BS receives the PDCP status report, since the BS knows the length of each transmitted PDCP SDU, it can calculate the number of UE received bytes (based on the information of correctly received PDCP SDU) and the number of missing bytes (based on the information of not correctly received PDCP SDU). For this purpose, the BS may need to store the length information of each transmitted PDCP SDU.

The time period between two consecutive PDCP status reports can be used for the BS to calculate transmission rate or error rate. For this purpose, the BS may configure the UE to send PDCP status reports periodically. At the indicated time, the UE sends a PDCP status report to the BS. The BS may also configure the UE to send a PDCP status report only when a missing PDCP SDU is detected. When a missing PDCP SDU is detected, the UE sends a PDCP status report to the BS.

The PDCP status report can be transmitted regardless of a type of a DRB and/or a handover. According to section 6.2.6 of 3GPP TS 36.323 V8.6.0 (2009-06), the conventional PDCP status report can only be triggered if two conditions are satisfied: (1) DRB is mapped on RLC AM and (2) a handover occurs. By the proposed invention, the PDCP status report is triggered when DRB is mapped on RLC UM and is not related to whether a handover occurs.

The PDCP configuration may include a periodicity of the PDCP status report. The PDCP status report may be transmitted periodically according to the periodicity.

The PDCP configuration may include a triggering condition for reporting the PDCP status. When the triggering condition is satisfied, the PDCP status report can be transmitted. For example, the triggering condition may include that the PDCP status report is transmitted when at least one PDCP SDU is detected as missed. The triggering condition may include that the PDCP status report is transmitted when a specific PDCP SDU is detected as missed. The triggering condition may include that the PDCP status report is transmitted when a number of missed PDCP SDUs is greater than a predefined value.

A BS can request the UE to send the PDCP status report. The request message may be transmitted as PDCP control PDU or a RRC message. The request message may include at least one of information on when the UE sends the PDCP status report, information on when the UE stops to send the PDCP status report and information on how many PDCP status reports are transmitted. When a periodic PDCP status report is configured, the request message may indicate the start of the periodic PDCP status report.

A BS can request the UE to stop to send the PDCP status report. The stop message may be transmitted as PDCP control PDU or a RRC message.

The PDCP status report may be transmitted as a PDCP control PDU.

Figure 7:
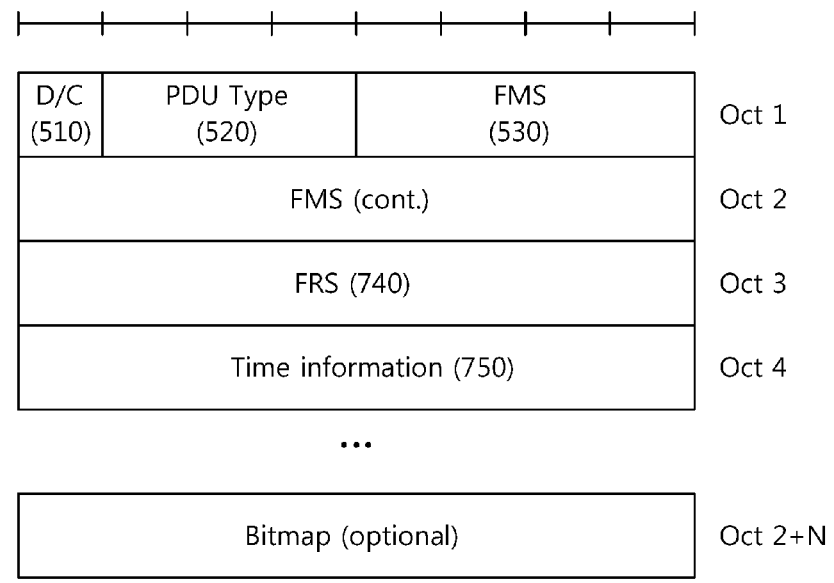
FIG. 7 shows an exemplary structure of PDCP control PDU for the PDCP status report according to an embodiment of the present invention.

FIG. 7 shows an exemplary structure of PDCP control PDU for the PDCP status report according to an embodiment of the present invention.

As shown in FIG. 5, the conventional PDCP status report includes a FMS field 530 and a BITMAP field 540. It means that the first PDCP SDU received by the UE within a given time period (i.e. the first received PDCP SDU after the last PDCP status report is sent) is not explicitly indicated to the BS.

For the BS to easily calculate the UE's received bytes per unit time, the proposed PDCP status PDU includes a First Received Sequence number (FRS) field 740. The FRS field 740 may include the information of SN of the first received PDCP SDU in this PDCP status report and may be defined to indicate the first received PDCP SDU.

The PDCP status PDU may include two SN fields: a first field (i.e. FMS field 530) and a second field (i.e. FRS field 740). When the BS receives the PDCP status PDU, the BS can consider that all the PDCP SDUs from the FRS to up to and not including FMS are correctly received by the UE.

The PDCP status PDU may include time information indicating when PDCP SDU(s) in the PDCP status PDU is received. The time information may include each time for each PDCP SDU or a reference time for all PDCP SDUs in the PDCP status PDU.

The embodiments are not limited to the exemplary PDCP control PDU shown in FIG. 7. The size of each field may vary and the order of fields may be changed. Not all fields are necessary. One or more fields can be omitted.

Figure 8:
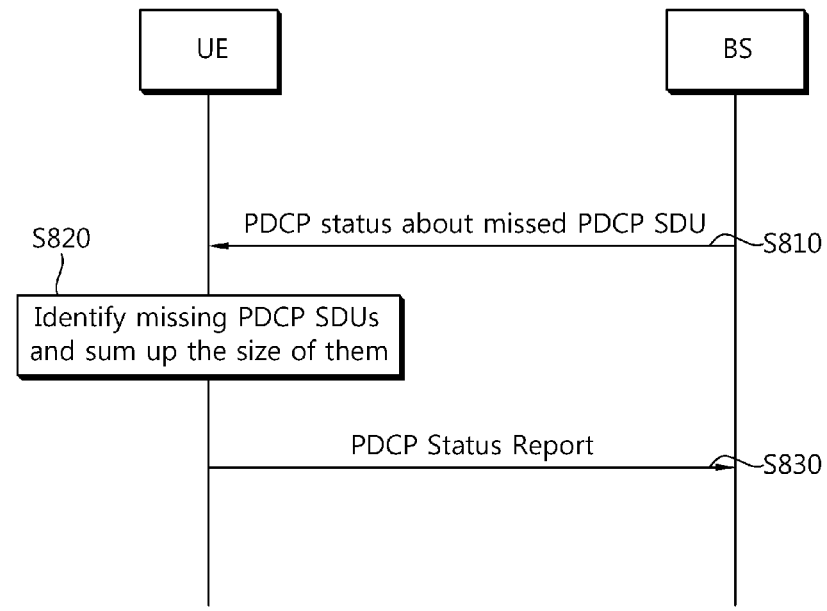
FIG. 8 is a flowchart showing a method for reporting PDCP status according to another embodiment of the present invention.

FIG. 8 is a flowchart showing a method for reporting PDCP status according to another embodiment of the present invention.

In step S810, a UE received from a BS a PDCP status about PDCP SUD(s) which the BS is not correctly received.

In step S820, the UE identifies the missing PDCP SDU(s) and sums up the size of the missing PDCP SDU(s).

In step S830, the UE transmits to the BS a PDCP status report indicating the size of the missing PDCP SDU(s).

For the uplink transmission, the BS knows the total size of received PDCP SDU and can calculate the throughput based on the total size of received PDCP SDU. However, the BS does not know information about the total size of the missing PDCP SDU since the BS does not know which size of PDCP SDU is sent by the UE.

The total size of the missing PDCP SDUs is difficult to calculate because the UE does not know which one is missing. To inform the UE of the missing PDCP SDUs, the BS sends the PDCP status to the UE. Then, the UE can know which one is missing, and can sum up the size of the missing PDCP SDUs. The total size is sent to the BS as a PDCP status report. The PDCP status report may be includes in a PDCP control PDU or a RRC message. After sending the total missing size, the UE can reset it to zero and can sum up again until the PDCP status report is transmitted next time.

Alternatively, the UE sends the PDCP status report indicating a total size of transmitting PDCU SDUs that the UE tries to send without receiving the PDCP status about missing PDCP SDU. Whenever a PDCP transmitting side receives a PDCP SDU from an upper layer, the PDCP transmitting side calculates the total size of the transmitting PDCP SDUs and reports the result. The BS can calculate the error rate based on the total size of the transmitting PDCP SDUs and the total size of received PDCP SUDs.

The UE may discard PDCP SDUs if a discard timer expires before the corresponding PDCP SDU is transmitted. Then, the UE calculates the total size of the discarded PDCP SDUs. The total size of discarded PDCP SDUs may be sent to the BS as the PDCP status report. After sending the total size of discarded PDCP SDUs, the UE resets it to zero and sums up again until it is transmitted next time.

The PDCP status report for uplink RB may include at least one of information on the total size of the missing PDCP SDUs, information on the total size of the transmitting PDCP SDUs and information on the total size of the discarded PDCP SDUs.

The PDCP status report may be transmitted periodically or may be triggered by a request from a network.

For periodic PDCP status report, a periodicity may be configured by the network. After transmitting the PDCP status report, the UE may reset the PDCP status report and may count the total size of missing PDCP SDUs/transmitting PDCP SDUs/discarded PDCP SDUs.

When the UE receives the request from a network, the UE sends the PDCP status report. After transmitting the PDCP status report, the UE may reset the PDCP status report and may count the total size of missing PDCP SDUs/transmitting PDCP SDUs/discarded PDCP SDUs.

Figure 9:
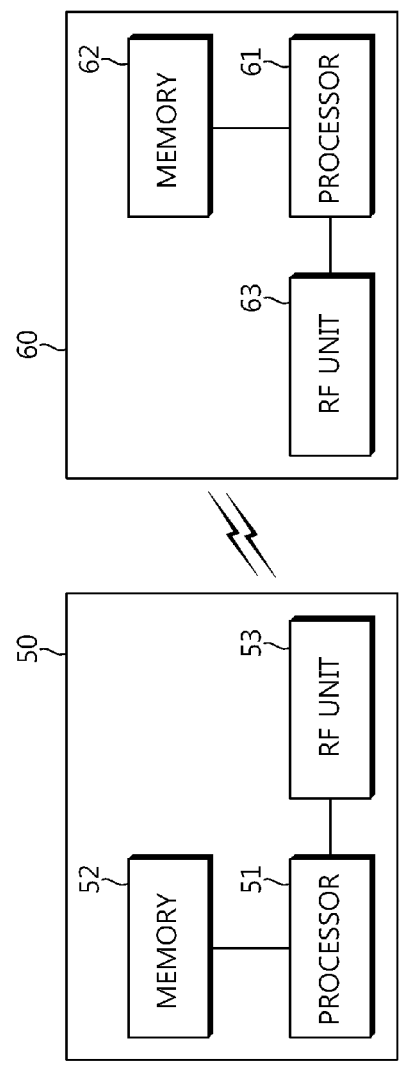
FIG. 9 is a block diagram showing a wireless communication system to implement the embodiments of the present invention.

FIG. 9 is a block diagram showing a wireless communication system to implement the embodiments of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement an operation of the BS according to the embodiments of FIG. 6 and FIG. 8.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 61 can implement an operation of the UE according to the embodiments of FIG. 6 and FIG. 8.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for reporting a Packet Data Convergence Protocol (PDCP) status in a wireless communication system, performed by a wireless device, the method comprising:
    setting a mode of the wireless device to be one of a Radio Link Control (RLC) Unacknowledged Mode (UM) and a RLC Acknowledged Mode (AM), the RLC AM mode being a mode where the wireless device calculates an amount of downlink or uplink PDCP Service Data Units (SDUs) that are successfully received or transmitted by the wireless device based on both a RLC status PDU and HARQ feedback, the RLC UM mode being a mode where the wireless device calculates the amount of downlink or uplink PDCP SDUs that are successfully received or transmitted by the wireless device only based on HARQ feedback, the RLC UM being a mode that does not provide any retransmission;
    when the mode is set to the RLC UM mode and is not set to the RLC AM mode, setting up a radio bearer that does not perform retransmission, the radio bearer being a logical path that is mapped from a physical layer of the wireless device to a RLC layer of the wireless device;
    receiving a PDCP configuration via the radio bearer;
    receiving or transmitting at least one PDCP Service Data Unit (SDU) via the radio bearer; and
    based on the received PDCP configuration, transmitting a PDCP status report for the radio bearer to a base station, the PDCP status report indicating which of the at least one PDCP Service Data Unit (SDU) is missing, a missing PDCP SDU being a PDCP SDU that has not been successfully received or transmitted by the wireless device,
    wherein the PDCP status report includes a first field indicating a Sequence Number (SN) of a first missing PDCP SDU and a second field indicating a SN of a first successfully received PDCP SDU, and
    wherein, based on the received PDCP configuration, the PDCP status report is transmitted periodically.

2. The method of claim 1, wherein the radio bearer is a data radio bearer (DRB) for the RLC UM.

3. The method of claim 1, wherein, based on the received PDCP configuration, the PDCP status report is transmitted when the at least one PDCP SDU is detected as missed.

4. The method of claim 1, wherein the PDCP status report includes time information indicating when the at least one PDCP SDU is received.

5. The method of claim 1, further comprising:
    based on the received PDCP configuration, transmitting the PDCP status report after receiving a request for transmission of the PDCP status report from the base station.

6. The method of claim 5, further comprising:
    based on the received PDCP configuration, stopping transmitting the PDCP status report after receiving a request for stopping transmission of the PDCP status report from the base station.

7. The method of claim 1, wherein the radio bearer is used as a path of downlink transmission.

8. The method of claim 1, wherein the radio bearer is used as a path of uplink transmission.

9. The method of claim 8, wherein the PDCP status report includes a total size of the at least one missing PDCP SDU.

10. The method of claim 1, wherein the PDCP status report is transmitted as a PDCP control Protocol Data Unit (PDU).

11. The method of claim 1, wherein the base station calculates a data volume of a User Equipment (UE) based on the SN of the first missing PDCP SDU and the SN of the first successfully received PDCP SDU.

12. The method of claim 11, wherein the data volume of the UE relates to a throughput and an error rate of a downlink data transmission received by the UE.

13. A wireless device configured for reporting a Packet Data Convergence Protocol (PDCP) status in a wireless communication system, the wireless device comprising:
    a radio frequency unit configured to receive and transmit a radio signal; and
    a processor, operably coupled with the radio frequency unit, configured to:
        set a mode of the wireless device to be one of a Radio Link Control (RLC) Unacknowledged Mode (UM) and a RLC Acknowledged Mode (AM), the RLC AM mode being a mode where the wireless device calculates an amount of downlink or uplink PDCP Service Data Units (SDUs) that are successfully received or transmitted by the wireless device based on both a RLC status PDU and HARQ feedback, the RLC UM mode being a mode where the wireless device calculates the amount of downlink or uplink PDCP SDUs that are successfully received or transmitted by the wireless device only based on HARQ feedback, the RLC UM being a mode that does not provide any retransmission;
        when the mode is set to the RLC UM mode and is not set to the RLC AM mode, set up a radio bearer that does not perform retransmission, the radio bearer being a logical path that is mapped from a physical layer of the wireless device to a RLC layer of the wireless device;
        receive a PDCP configuration via the radio bearer;
        receive or transmit at least one PDCP Service Data Unit (SDU) via the radio bearer; and based on the received PDCP configuration, transmit a PDCP status report for the radio bearer to a base station, the PDCP status report indicating which of the at least one PDCP Service Data Unit (SDU) is missing, a missing PDCP SDU being a PDCP SDU that has not been successfully received or transmitted by the wireless device, wherein the PDCP status report includes a first field indicating a Sequence Number (SN) of a first missing PDCP SDU and a second field indicating a SN of a first successfully received PDCP SDU, and wherein, based on the received PDCP configuration, the PDCP status report is transmitted periodically.

14. The wireless device of claim 13, wherein the radio bearer is a data radio bearer (DRB) for the RLC UM.

15. The wireless device of claim 13, wherein the base station calculates a data volume of a User Equipment (UE) based on the SN of the first missing PDCP SDU and the SN of the first successfully received PDCP SDU.

16. The wireless device of claim 15, wherein the data volume of the UE relates to a throughput and an error rate of a downlink data transmission received by the UE.

* * * * *